(12) United States Patent
Curlier et al.

(10) Patent No.: US 10,495,005 B2
(45) Date of Patent: Dec. 3, 2019

(54) EPICYCLIC REDUCTION DEVICE FOR THE ROTATIONAL DRIVE OF BLADE SETS OF A REDUCTION TURBOMACHINE

(71) Applicant: SAFRAN AIRCRAFT ENGINES, Paris (FR)

(72) Inventors: Augustin Curlier, Boissise la Bertrand (FR); Julien Michel Patrick Christian Austruy, Yerres (FR); Tewfik Boudebiza, Paris (FR); Gilles Alain Charier, La Grande Paroisse (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 735 days.

(21) Appl. No.: 15/110,001

(22) PCT Filed: Dec. 24, 2014

(86) PCT No.: PCT/FR2014/053553
§ 371 (c)(1),
(2) Date: Jul. 6, 2016

(87) PCT Pub. No.: WO2015/104474
PCT Pub. Date: Jul. 16, 2015

(65) Prior Publication Data
US 2016/0326964 A1 Nov. 10, 2016

(30) Foreign Application Priority Data
Jan. 7, 2014 (FR) ...................................... 14 50080

(51) Int. Cl.
*F16H 1/28* (2006.01)
*F02C 7/36* (2006.01)
(Continued)

(52) U.S. Cl.
CPC ................ *F02C 7/36* (2013.01); *F02K 3/072* (2013.01); *F16D 3/223* (2013.01); *F16H 1/28* (2013.01);
(Continued)

(58) Field of Classification Search
CPC ... F02C 7/36; F16H 1/28; F16D 3/223; F02K 3/072
See application file for complete search history.

(56) References Cited

U.S. PATENT DOCUMENTS 3,352,178 A * 11/1967 Lindgren ................... F16H 1/28
475/343
5,116,293 A * 5/1992 Reuter ................. B60K 17/342
403/57
(Continued)

FOREIGN PATENT DOCUMENTS

EP 1 857 713 A1 11/2007
FR 2 979 121 A1 2/2013
(Continued)

OTHER PUBLICATIONS

International Search Report dated Apr. 24, 2015, in PCT/FR2014/053553 filed Dec. 24, 2014.

*Primary Examiner* — Patrick H Mackey
(74) *Attorney, Agent, or Firm* — Oblon, McClelland, Maier & Neustadt, L.L.P.

(57) ABSTRACT

An epicyclic gear device for driving rotation of a first blade set of a turbine engine, the device: including a sunwheel centered on a longitudinal axis of the turbine engine and connected to a rotor of the engine in order to be driven in rotation; at least one planet meshing with the sunwheel; a planet carrier rotatably carrying the planet and connected to a first blade set in order to drive it in rotation; and a ring
(Continued)

meshing with the planet; the sunwheel being connected to the rotor via a first constant velocity ball transmission joint.

10 Claims, 3 Drawing Sheets

(51) Int. Cl.
    *F02K 3/072*     (2006.01)
    *F16D 3/223*     (2011.01)

(52) U.S. Cl.
    CPC ... *F05D 2260/40311* (2013.01); *Y02T 50/671* (2013.01)

(56) References Cited

U.S. PATENT DOCUMENTS

| | | | | |
|---|---|---|---|---|
| 6,622,473 B2* | 9/2003 | Becquerelle | ............ | F01D 15/12 |
| | | | | 60/226.1 |
| 6,666,102 B2* | 12/2003 | Gmirya | ............ | B64C 27/12 |
| | | | | 74/406 |
| 7,322,180 B2* | 1/2008 | Lapergue | ............ | F01D 21/045 |
| | | | | 415/104 |
| 7,591,754 B2* | 9/2009 | Duong | ............ | F16D 3/72 |
| | | | | 475/347 |
| 7,694,505 B2* | 4/2010 | Schilling | ............ | F02C 7/36 |
| | | | | 60/226.1 |
| 7,726,113 B2* | 6/2010 | Orlando | ............ | F02C 3/107 |
| | | | | 415/61 |
| 2007/0286539 A1 | 12/2007 | Leimann | | |
| 2009/0062058 A1* | 3/2009 | Kimes | ............ | F16H 1/28 |
| | | | | 475/344 |
| 2009/0090096 A1* | 4/2009 | Sheridan | ............ | F02C 7/36 |
| | | | | 60/226.3 |
| 2011/0143880 A1* | 6/2011 | Minadeo | ............ | F16H 1/48 |
| | | | | 475/346 |
| 2012/0099988 A1 | 4/2012 | Charier et al. | | |
| 2012/0189430 A1* | 7/2012 | McCune | ............ | F01D 5/027 |
| | | | | 415/122.1 |
| 2013/0045102 A1 | 2/2013 | Gallet et al. | | |
| 2013/0192264 A1* | 8/2013 | McCune | ............ | F16H 57/0006 |
| | | | | 60/805 |

FOREIGN PATENT DOCUMENTS

| | | | |
|---|---|---|---|
| GB | 817490 A | | 7/1959 |
| JP | 8-61450 A | | 3/1996 |
| JP | 08061450 A | * | 3/1996 |
| JP | 11-190397 A | | 7/1999 |

\* cited by examiner

EPICYCLIC REDUCTION DEVICE FOR THE ROTATIONAL DRIVE OF BLADE SETS OF A REDUCTION TURBOMACHINE

BACKGROUND OF THE INVENTION

The present invention relates to the general field of turbine engines having gearing driven in rotation by means of a single turbine. It is thus equally applicable to airplane turboprops having one or two propellers comprising a single blade set or two unducted contrarotating blade sets, and to airplane turbojets having one or two fans comprising one blade set or two ducted contrarotating blade sets. The invention relates more particularly to an epicyclic gear device used between the shaft of the turbine rotor and the drive shaft(s) for driving rotation of the blade set(s) that is/are driven by the turbine.

In known manner, an airplane turboprop with two propellers has two contrarotating unducted blade sets. In certain two-propeller turboprop architectures, the two blade sets are driven in rotation directly by a power turbine having two contrarotating rotors. In other architectures to which the present invention relates more particularly, the blade sets are driven by a single rotor of the power turbine. By way of example, reference may be made to Document FR 2 979 121, which describes an embodiment of such an architecture.

The contrarotating propellers of such a turboprop may be driven in rotation directly or indirectly via a mechanical transmission device forming a speed reducing gearbox and including an epicyclic gear train. In general, the epicyclic gear train comprises a set of rolling elements with straight teeth including a sunwheel that is centered on the longitudinal axis of the turboprop and that is connected upstream to the rotor of the power turbine in order to be driven thereby. Downstream, the sunwheel acts via the ring and the planet carrier to output its rotary motion at different speed and torque to the two blade sets of the turboprop.

Given the mechanical environment in which the turboprop exists, misalignments between the axes of the shafts connected to the various rolling elements of the epicyclic gear have an impact directly on their teeth. By acting as bearing points seeking to bring misaligned shafts into alignment, the teeth are either subjected to premature wear, which is extremely deleterious to the lifetime of the gear as a whole, or else they require increased thicknesses of material of a kind that leads to highly penalizing constraints on integration when developing an on-board device of weight and size that must necessarily be minimized.

In order to reduce significantly the concentration of stresses in the straight teeth of such epicyclic gearing, it is known to create a difference between the bending stiffnesses of the inlet and outlet shafts of the gearing, thereby having the effect of reducing the force needed to bring the ends of the shafts into alignment. Any misalignments between the shafts are thus compensated by the flexibilities of the shafts, and they are then taken up at the contacts between the straight teeth of the rolling elements of the epicyclic gear by relative sliding between them.

Nevertheless, that solution still presents numerous drawbacks. In addition to such straight-tooth epicyclic gearing having power density that is rather low, it generates a large amount of noise, since force transmission is interrupted by jolts that occur on transition from one tooth to another, thereby generating metallic clicks. Furthermore, the repeated mechanical impacts imposed on the teeth reduce their lifetime.

There therefore exists an unsatisfied need for an epicyclic gear device for a turbine engine with gearing in which the power density is significantly increased.

OBJECT AND SUMMARY OF THE INVENTION

A main object of the present invention is thus to mitigate such drawbacks by proposing to increase the tolerance of the epicyclic gearing to misalignment when the turbine engine is subjected to deformation in operation, while maintaining the degrees of freedom that are essential for such operation. Another object of the invention is to provide a continuous transition of contact between the teeth while they are transmitting force so as to avoid transmission by jolts and associated impact phenomena.

These objects are achieved by an epicyclic gear device for driving rotation of at least a first blade set of a turbine engine, the device comprising a sunwheel centered on a longitudinal axis of the turbine engine and adapted to be connected to a rotor of the engine in order to be driven in rotation, at least one planet meshing with said sunwheel, a planet carrier rotatably carrying said at least one planet and suitable for being connected to said at least one first blade set in order to drive it in rotation, and a ring meshing with said at least one planet, the device being characterized in that said sunwheel is suitable for being connected to said rotor of the engine via a first constant velocity ball transmission joint.

The presence at one end of the sunwheel shaft of a constant velocity joint makes it possible to give the shaft a large amount of mechanical flexibility, both radially and angularly, so as to enable it to absorb the deformation to which the turbine engine is subjected in operation. This reinforces the ability of the elements of the epicyclic gear to withstand misalignment and the risks of wear.

When the turbine engine (turboprop or turbojet) has two contrarotating propellers or fans, said ring is suitable for being connected to said second blade set via a second constant velocity ball transmission joint.

Advantageously, said first and second constant velocity ball transmission joints are selected from the following: a Rzeppa joint, a Weiss joint, a plunging joint, a double-offset plunging joint.

Preferably, said first constant velocity ball transmission joint has a first end provided with a flange extending radially outwards, and a second end opposite from said first end and provided with an annular portion mounted around said sunwheel by a system of fluting. Said flange of said first constant velocity ball transmission joint is suitable for being fastened to a flexible drive shaft of said rotor of the turbine of the turboprop via a plurality of bolted connections.

Advantageously, said second constant velocity ball transmission joint has a first end provided with a flange extending radially outwards and a second end opposite from said first end and provided with a flange extending radially inwards and suitable for being fastened to a flexible drive shaft of said second blade set via a plurality of bolted connections.

This leads to a configuration that further improves the ability to obtain considerable radial flexibility for the shaft of the turbine rotor of the engine.

In an "inverted" configuration, said flexible drive shaft of said second blade set is mounted inside a stiff drive shaft of said first blade set that is suitable for being fastened to said planet carrier.

In order to cancel the axial thrust generated between the rotating elements of the epicyclic gear device, said sunwheel, said at least one planet, and said ring are doubled up axially, and each comprises helical wheels mounted in opposition (in a double helix).

BRIEF DESCRIPTION OF THE DRAWINGS

Other characteristics and advantages of the present invention appear better from the following description made with reference to the accompanying drawings, which show an embodiment having no limiting character and in which.

DETAILED DESCRIPTION OF THE INVENTION

Figure 1:
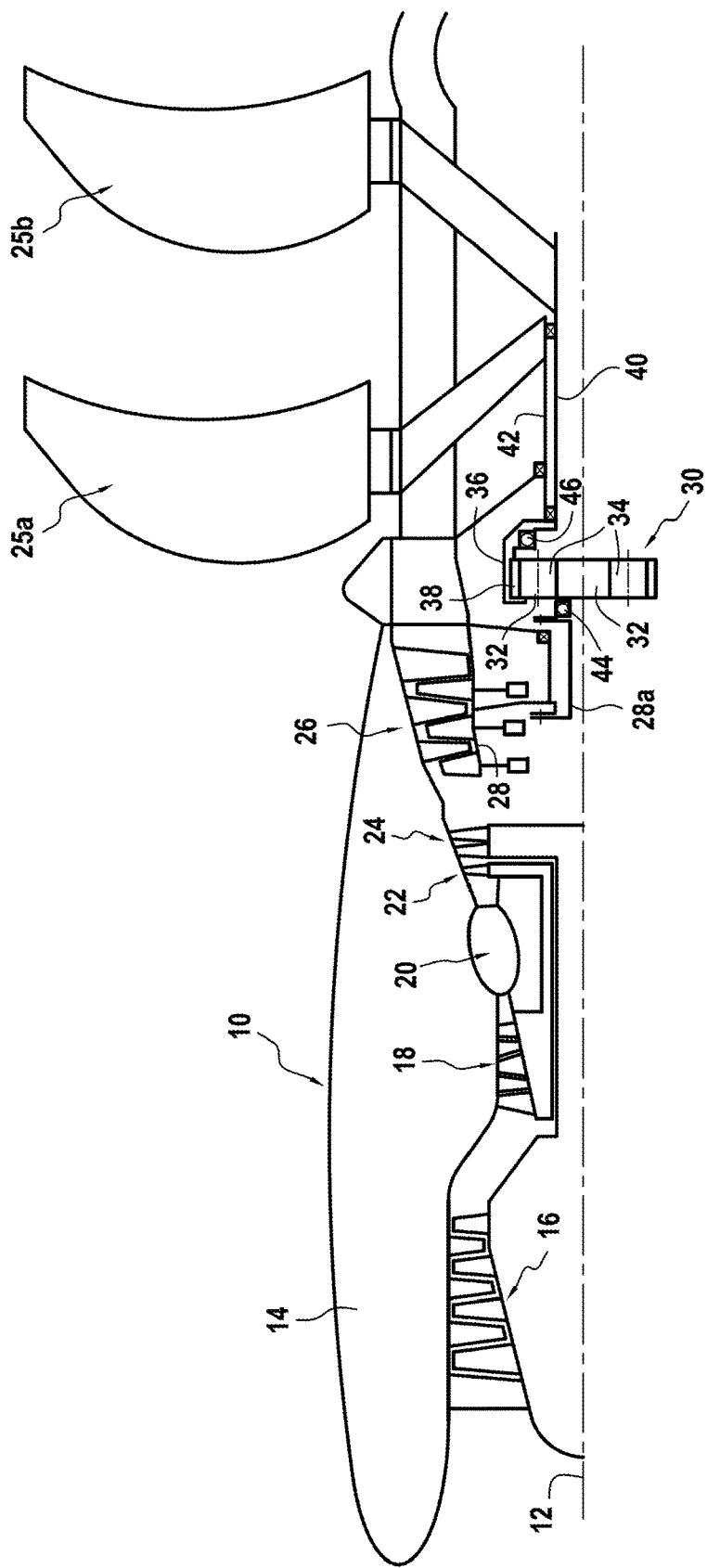
FIG. 1 is a diagrammatic longitudinal half-section view of a two-propeller turboprop having an epicyclic gear device in accordance with the invention.

FIG. 1 is a highly diagrammatic view of an embodiment of an airplane turboprop of the type having two propellers (open rotor pusher) in which the epicyclic gear device of the invention can be incorporated. Such a turboprop is well known and is therefore not described in detail.

The turboprop 10 comprises in particular a longitudinal axis 12 and an annular nacelle 14 arranged coaxially around the longitudinal axis. From upstream to downstream, the turboprop 10 further comprises a low-pressure compressor 16, a high-pressure compressor 18, a combustion chamber 20, a low-pressure turbine 22, and an intermediate-pressure turbine 24.

Downstream from the intermediate-pressure turbine 24 there is a system of contrarotating propellers, namely an (upstream or front) first set 25a and a (downstream or rear) second set 25b of adjustable pitch blades driven in rotation by means of a low-pressure turbine 26 arranged downstream from the intermediate-pressure turbine 24. The low-pressure turbine comprises in particular a rotor 28 that drives the two blade sets 25a and 25b in rotation via an epicyclic gear device 30.

In the invention, the epicyclic gear device 30 comprises a sunwheel 32 in the form of a wheel with external teeth, centered on the longitudinal axis 12 of the turboprop and secured upstream to the rotor 28 of the low-pressure turbine 26. It also has at least one planet 34, and preferably a plurality (in the range three to six), each planet having the form of a wheel with external teeth and meshing with the sunwheel 32.

Each planet 34 presents an axis that is off-center relative to the longitudinal axis 12 and it is rotatably carried by a planet carrier 36 centered on the longitudinal axis 12, the planet carrier being secured downstream to the upstream blade set 25a so as to be capable of driving it directly in rotation about the longitudinal axis 12. The epicyclic gear device 30 also has a ring 38 centered on the longitudinal axis 12 and meshing with each of the planets 34 via internal teeth, the ring being secured downstream to the downstream blade set 25b so as to be capable of driving it directly in rotation about the longitudinal axis 12.

This epicyclic gear is said to be "inverted" since the drive shaft 40 of the downstream propeller at the outlet from the ring is inside the drive shaft 42 of the upstream propeller at the outlet from the planet carrier. The advantage of this inversion is to have torque on the downstream propeller that is less than the torque on the upstream propeller so as to reduce the size of the hub of the downstream propeller and thus its weight. With this configuration, the upstream propeller rotates in the opposite direction to the turbine and the downstream propeller in the same direction as the fan. It is naturally possible to have a direct gear train, the configuration, i.e. direct or inverted, being a function of the torque that it is desired to have available for each element and comes within the competence of the person skilled in the art, and it in turn has an influence on selecting between shafts that are flexible or rigid.

Thus, the rotor 28 of the low-pressure turbine drives rotation of the sunwheel 32 of the epicyclic gear device, which in turn retransmits this rotary motion, via the planet carrier 36 (via the planets 34) and via the ring 38, both to the upstream blade set 25a and to the downstream blade set 25b in order to drive them in rotation in contrarotating manner.

Figure 2:
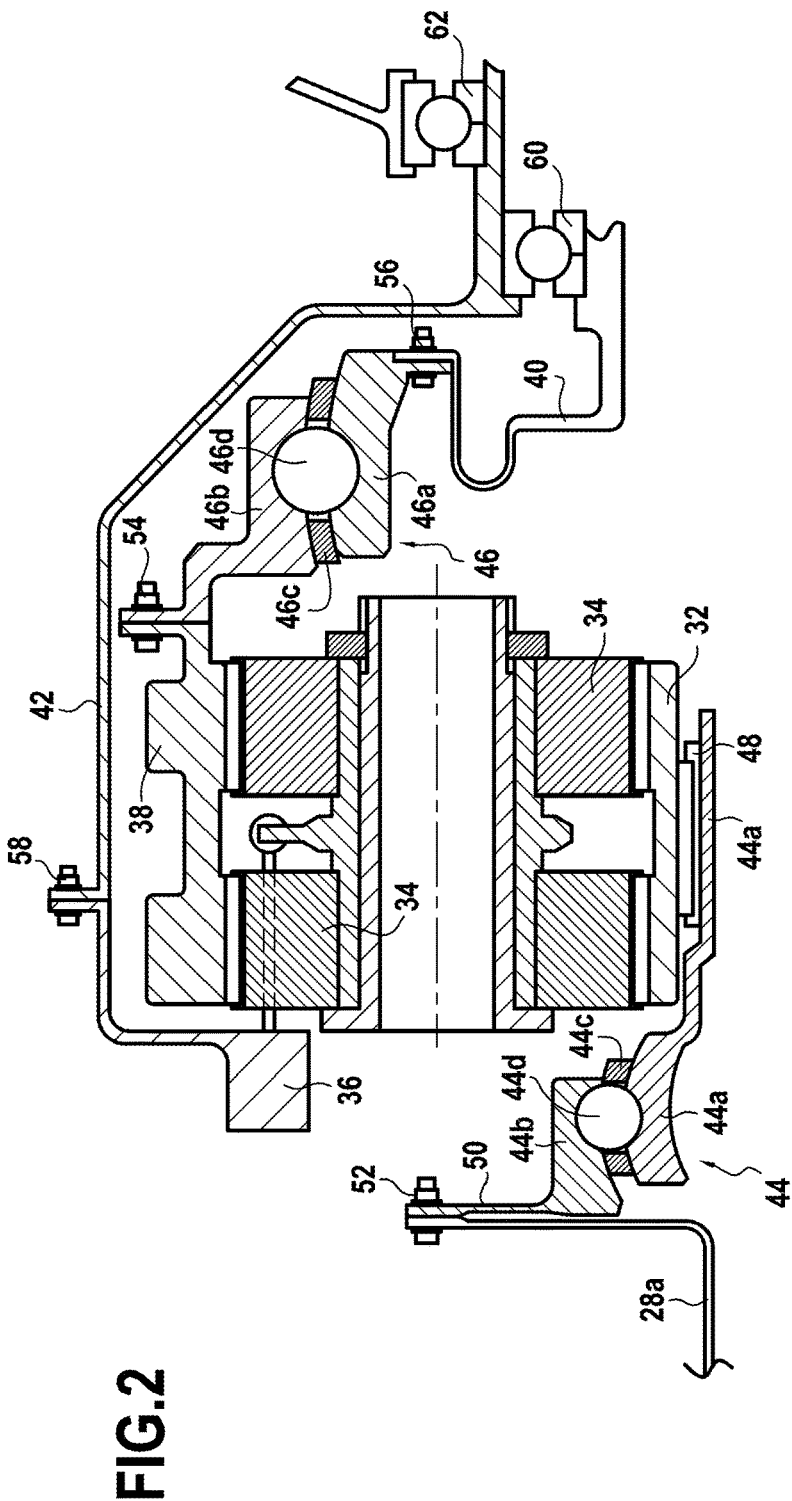
FIG. 2 is a detailed view showing the epicyclic gear device of the invention.

As shown in greater detail in FIG. 2, the sunwheel 32 is connected to the rotor in flexible manner (flexible in bending) via a first ball transmission joint 44, and the ring 38 is connected to the second propeller (the downstream or second blade set 25b) likewise in flexible manner via a second ball transmission joint 46, the planet carrier 26 being connected in stiff manner to the first propeller (the upstream first blade set 25a).

More precisely, the first ball transmission joint 44 has a first end, remote from a second end constituted by an annular portion 44a mounted by a system of fluting 48 on the sunwheel 32, a flange 50 extending radially inwards and fastened to a radial flange of a flexible drive shaft 28a secured to the rotor 28 of the low-pressure turbine via a plurality of bolted connections 52. The second transmission ball joint 46 has its first end fastened to the ring 38 via a plurality of bolted connections 54 and its second end is fastened, likewise via a plurality of bolted connections 56, to the flexible drive shaft 40 secured to the second blade set 25b. Likewise, a plurality of bolted connections 58 provide fastening between the planet carrier 36 and the stiff drive shaft 42 secured to the first blade set 25a.

Thus, by coupling the sunwheel and the ring with their respective shafts by constant velocity ball transmission joints serving to limit stress concentrations in the teeth of the rolling elements in the event of angular or radial misalignment, the need for an axial degree of freedom at the teeth (freedom to shift axially) is eliminated, even though it is essential in prior art straight-tooth epicyclic gear trains. It should also be observed that the flexible shafts and the two ball transmission joints provide a degree of adaptability.

By using these constant velocity joints, it is possible to eliminate a degree of freedom to move in translation and thus to have recourse to teeth that are helical instead of teeth that are straight, and because of the continuity in force transmissions, the power density of the epicyclic gear device is increased. In practice, the epicyclic gear train is a double epicyclic gear train with helical wheels mounted in opposition (double helix). In this way, axial movement between the rolling elements of the gear device is eliminated.

The constant velocity ball transmission joints are preferably Rzeppa joints that are assembled to the rolling elements (sunwheel or ring) as a function of the options available for incorporating them in the turbine engine. The elements of the ball transmission joint (centers 44a, 46a; bowls 44b, 46b; cages 44c, 46c; and balls 44d, 46d) can be integrated directly with the rolling elements and with the shafts, or they may be installed separately with the help of the fluting 48 for the sunwheel 32 or the bolted flange 54 for the ring 38, as shown in FIG. 2.

For low-power applications (not shown), it is also possible to envisage locking the elements of the transmission joint via a spring clip and passing drive merely via a groove, with contact between the races and the rolling elements possibly also being maintained merely by a spring.

It should be observed that such constant velocity ball transmission joints are sensitive to relative axial movements between these various components. Specifically, an axial movement of the center relative to the bowl can have the effect of contact being lost between the balls of the joints and their bearing surfaces. It is therefore necessary to know the possible axial shifts that may happen between the shafts in operation and to pre-stress the joints so as to conserve contact between the races the balls under all loading circumstances that are encountered. It should be observed that the balls that are held in a common plane by a cage, which is necessary to prevent the balls escaping during relative axial spacing between the two elements coupled together by the joints, cannot press into the races, so compression on the transmission joint does not raise any particular problem.

More particular attention should be given to the radial positioning of the two transmission joints 44 and 46 relative to the bearings 60 and 62 that carry the drive shafts of the two propellers. Specifically, when reasoning in terms of misalignment that is purely angular between the stiff drive shaft 42 (connected to the planet carrier) and one of the flexible drive shafts 28a, 40 (connected to the sunwheel and to the ring), it is found that if the bearing centers of the transmission joints coincide with the center of rotation of the misaligned shaft, then rotation is free and no bending stress is induced in the shafts or in the teeth of the rolling elements. Since the positions of these centers are unknown and vary as a function of the loads applied to the engine, it is possible to envisage approximating a "mean" position so as to maximize the action of the transmission joints and reduce the stress in the drive shafts and in the teeth, while making use of the bending flexibilities of the flexible drive shafts of the ring and of the sunwheel. These adaptabilities make it possible in particular to take up potential radial misalignment between two of the drive shafts which must necessarily take up a portion of the stresses associated with these shafts bending in the teeth. Specifically, it is found that during angular or radial misalignment of the turbine shaft relative to the stiff drive shaft of the first propeller, the geometrical configuration of the transmission joint secured to the sunwheel will have an influence on the distribution of stresses.

It is advantageous to observe that in the event of radial misalignment between the stiff drive shaft of the first propeller and one of the flexible shafts, the device will tend to return into a configuration in which both shafts are misaligned only angularly, with the only stresses that are inevitable in the teeth being those needed for bending the flexible shaft in order to return to this configuration. It is thus particularly advantageous to ensure that the flexible shafts are as flexible as possible.

Although the above description is given with respect to Rzeppa joints, it is naturally possible to have recourse to other types of constant velocity ball transmission joints, such as a Weiss joint, a plunging joint, or indeed a double-offset plunging joint.

Plunging joints and double offset-plunging joints are particularly advantageous since they possesses straight races, giving an additional degree of freedom (axially) and thus eliminating the need to add prestress to allow a fraction of the thrust forces to pass through the epicyclic gear train instead of being communicated to the structure via the bearings of the drive shafts, as mentioned above. In comparison, the acceptable angular offset is smaller than for a Rzeppa joint but may be as much as about twenty degrees, which is generally entirely sufficient.

More particularly, for a "VL" plunging joint, the races generated by intersecting curves are straight lines arranged like the edges of a single sheet hyperboloid, being inclined alternately to right and to left, there being six couples. They are made in the form of outer grooves in the center and inner grooves in the bowl, that are put into correspondence by the balls. Because of the crossed configuration of the races, it is essential for the cage, which holds the balls together, to provide freedom in a circumferential direction in order to enable the balls to follow the races in the event of relative axial movement between the two coupled-together elements.

Thus, the invention makes it possible to reduce the level of stress in the teeth by providing an architecture that completely absorbs axial misalignment between the drive shafts and thus between the component elements of the epicyclic gear device, without generating the stresses of prior art systems.

Naturally, although the epicyclic gear device of the invention is described with reference to the turboprop of FIG. 1, it should be observed that the same architecture is entirely applicable to an airplane turbojet of the two fan type (the downstream blades now being arranged upstream). In this application, the sunwheel 32 centered on the longitudinal axis 12 of the turbojet is then secured downstream to the rotor 28 of the low-pressure turbine 26. Each of the planets 34 meshing with the sunwheel 32 presents an axis that is off-center relative to the longitudinal axis 12 and they are rotatably carried by a planet carrier 36 that is centered on the longitudinal axis, the planet carrier being secured upstream to the first blade set 25a of the fan so as to be capable of driving it directly in rotation about the longitudinal axis 12. Finally, the ring 38 centered on the longitudinal axis 12 and meshing with each planet 34 is secured upstream to the second blade set 25b so as to be capable of driving the fan directly in rotation about the longitudinal axis 12.

Figure 3:
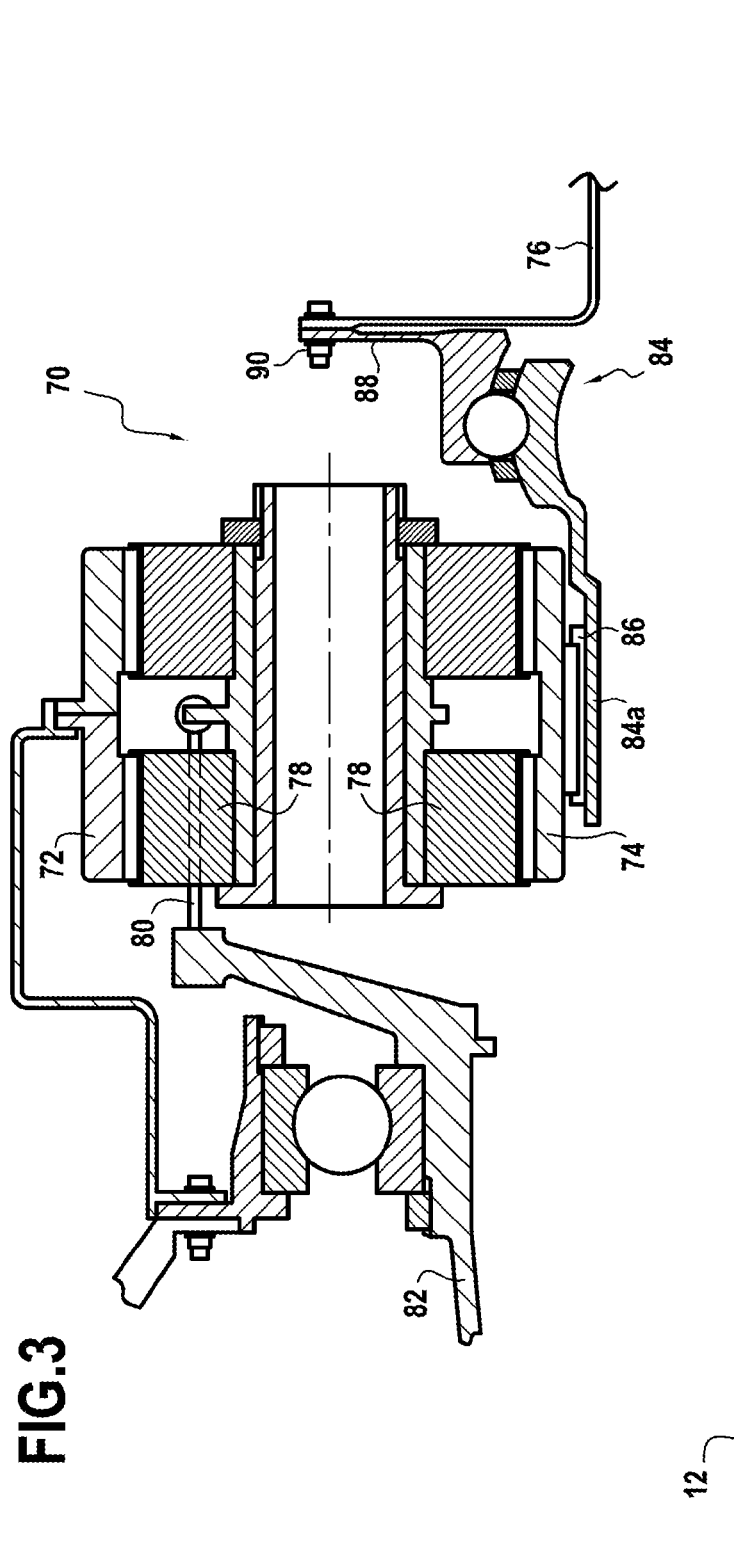
FIG. 3 is a view showing a second embodiment of an epicyclic gear device of the invention applied to a turbojet with a gearbox and a single propeller.

Likewise, although the invention is applied in the two above embodiments to gearing acting differentially on two contrarotating blade sets, it is clear that it can equally well be applied, as shown in FIG. 3, to gearing acting on a single propeller or fan in which one of the elements of the gear device is blocked (the problem of stresses in the teeth remaining the same).

Specifically, in such a geared turbine engine (a turboprop with one propeller or a turbojet with one fan), the gear 70 is interposed between the low-pressure compressor, which may be driven at a high speed, and the fan, which on the contrary may be driven at a low speed. The gear 70 conventionally has a stationary ring 72, a sunwheel 74 driven by the low-pressure shaft 76 of the rotor of the low-pressure compressor, and planets 78 acting via their planet carrier 80 to drive the fan shaft 82 of the fan.

Unlike the above-described embodiment, the epicyclic gear train used is a conventional gear train, not a differential gear train, having one inlet: the low-pressure shaft 76, and one outlet: the fan shaft 82. In the invention, since the fan shaft is stiff, adaptability is obtained for the low-pressure shaft, which is connected to the sunwheel via a constant velocity ball transmission joint 84.

More precisely, this constant velocity ball transmission joint 84 has an upstream end remote from a downstream end constituted by an annular portion 84a mounted by a system of fluting 86 on the sunwheel 74, and a flange 88 extending radially outwards and fastened to a radial plate of the low-pressure shaft 76 via a plurality of bolted connections 90.

When the gear has smooth bearings, the constant velocity ball transmission joint is advantageously a Rzeppa or a Weiss joint in order to avoid presenting any axial degree of freedom. The resulting assembly is thus isostatic.

In contrast, if the gear has barrel bearings, the constant velocity ball transmission joint is advantageously a plunging joint or a double-offset plunging joint, in which case it is necessary to provide a sliding fluted connection between the ring and the casing (not shown) in order to eliminate the additional degree of freedom imparted by the joint.

The invention claimed is:

1. An epicyclic gear device for driving rotation of at least a first blade set of a turbine engine, the device comprising:
    a sunwheel centered on a longitudinal axis of the turbine engine and adapted to be connected to a rotor of the engine in order to be driven in rotation;
    at least one planet meshing with said sunwheel;
    a planet carrier rotatably carrying said at least one planet and suitable for being connected to said at least one first blade set in order to drive said at least one first blade set in rotation;
    a ring meshing with said at least one planet; and
    a first constant velocity ball transmission joint,
    wherein the sunwheel is configured to be connected to said rotor of the engine via said first constant velocity ball transmission joint, and
    wherein said first constant velocity ball transmission joint has a first end provided with a flange extending radially outwards, and a second end opposite from said first end and provided with an annular portion mounted around said sunwheel by a system of fluting.

2. The device according to claim 1, wherein said first constant velocity ball transmission joint is a joint selected from the following: a Rzeppa joint, a Weiss joint, a plunging joint, a double-offset plunging joint.

3. The device according to claim 1, wherein said flange of said first constant velocity ball transmission joint is suitable for being fastened to a flexible drive shaft of said rotor of the engine via a plurality of bolted connections.

4. The device according to claim 1, wherein said ring is suitable for being connected to a second blade set via a second constant velocity ball transmission joint.

5. The device according to claim 4, wherein said first or second blade sets belong to one or two propellers of a turboprop or to one or two fans of a turbojet.

6. The device according to claim 4, wherein said second constant velocity ball transmission joint is selected from the following: a Rzeppa joint, a Weiss joint, a plunging joint, a double-offset plunging joint.

7. The device according to claim 4, wherein said second constant velocity ball transmission joint has a first end provided with a first flange extending radially outwards and a second end opposite from said first end and provided with a second flange extending radially inwards.

8. The device according to claim 7, wherein a flexible drive shaft of said second blade set is mounted inside a stiff drive shaft of said first blade set that is suitable for being fastened to said planet carrier.

9. The device according to claim 1, wherein said sunwheel, said at least one planet, and said ring are each doubled up axially and comprising helical wheels mounted in opposition in a double helix configuration so as to cancel an induced axial thrust.

10. The device according to claim 7, wherein said second flange of said second constant velocity ball transmission joint is suitable for being fastened to a flexible drive shaft of said second blade set via a plurality of bolted connections.

* * * * *